(No Model.) 2 Sheets—Sheet 1.

P. PFEIFER.
AXLE BOX.

No. 408,633. Patented Aug. 6, 1889.

WITNESSES
F. L. Durand
Alex Mahon

INVENTOR
Peter Pfeifer
By S. W. Finsabaugh
Attorney (No Model.) 2 Sheets—Sheet 2.
P. PFEIFER.
AXLE BOX.
No. 408,633. Patented Aug. 6, 1889.
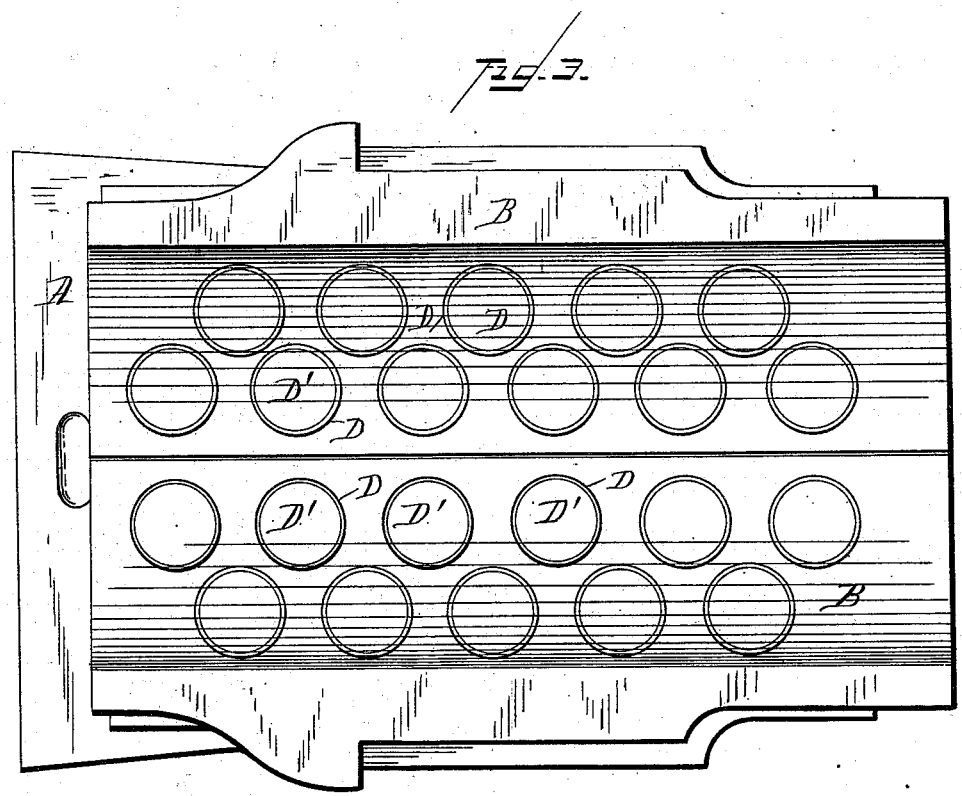

UNITED STATES PATENT OFFICE.

PETER PFEIFER, OF DURHAMVILLE, NEW YORK.

AXLE-BOX.

SPECIFICATION forming part of Letters Patent No. 408,633, dated August 6, 1889.

Application filed March 14, 1889. Serial No. 303,259. (No model.)

*To all whom it may concern:*

Be it known that I, PETER PFEIFER, a citizen of the United States, residing at Durhamville, in the county of Oneida and State of New York, have invented new and useful Improvements in Axle-Boxes; and I do hereby declare the following to be a full, clear, and exact description of said invention, reference being had to the accompanying drawings, and to the letters or figures of reference marked thereon, which form a part of this specification.

The invention relates to improvements in journal or axle bearings, and is particularly applicable for car-axle boxes.

The invention consists in forming the bearing-face partly of glass, placed in receptacles of any desired shape in the metal face, whereby a bearing-surface of non-conducting material is formed.

It further consists in forming the bearings in two halves or parts, whereby the bearing-surface is adapted to conform to the axle when the same becomes worn or in applying new bearings to axles.

It further consists in providing the bearings or half journal-bearings with a dovetail projection to engage grooves formed in the shell or cap, whereby the bearings are permitted to give or yield while being held securely to the shell or cap, all as hereinafter explained.

Figure 1:
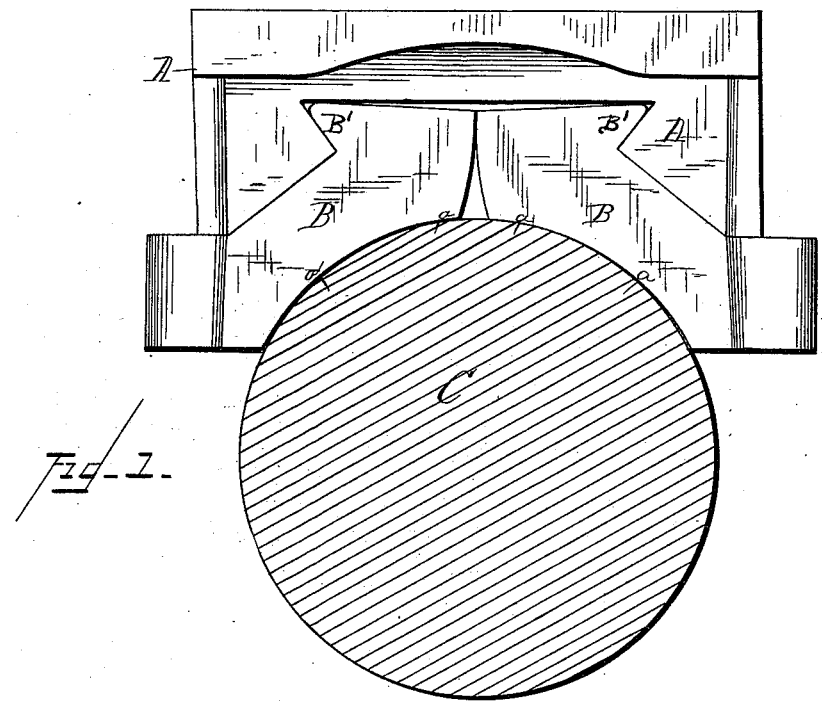
Figure 2:
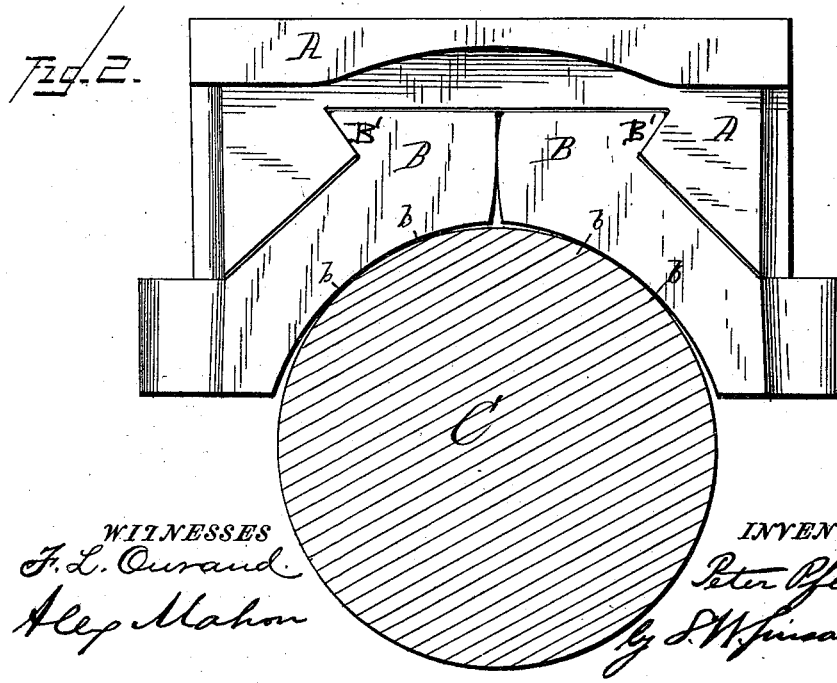

In the accompanying drawings, Figure 1 is a face view of the wedge with the bearing-blocks in position, showing the axle or journal in section, and said view showing the parts when new. Fig. 2 is a similar view where a new journal-box is applied and the axle has become worn. Fig. 3 is a face view of the boxes, showing the glass bearing set into the metal face.

The shell or cap A is made in the usual or in any desired form, except that the same is provided with longitudinally-arranged V-shaped grooves, hereinafter referred to. The journal-bearing is made in two halves B B, with the abutting faces of the two halves made slightly convex, as shown, to form when the journals are new a V-shaped opening between said abutting faces. When the axle C and the bearings are both new, the relation of the parts will be as shown in Fig. 1, with the half-bearings spread apart, and the points of bearing being between the points $a$ $a$; but when a new bearing is applied to an old axle where the same has become worn the abutting faces will be forced closer together, as shown in Fig. 2, and the points of bearing of the axle on the bearings will be between the points $b$ $b$, Fig. 2, leaving a small space between the axle and the half-bearings near the center. The half-bearings are provided with projecting flanges B' to engage the V-shaped grooves in the wedge, which construction, while serving to hold the half-bearings connected with the wedge, permits them to yield to accommodate axles of different sizes. By this construction of bearing, or by making the bearing in two halves and connecting said parts to the wedge by the V-shaped or dovetail connection, I am enabled to apply new bearings to old axles and allow the bearing to adjust itself to the size of the axle.

The wearing-surface of the bearing is cut out or provided with recesses, as shown at D, which in this instance are shown as made circular in form, and which have inserted therein glass blocks D', as shown. These blocks, as also the recesses, may be either round, square, or polygonal, or in any preferred form, and are held in the recesses by means of plaster-of-paris, or any similar material, and form a non-conducting wearing-surface.

By making the wearing-surface of a non-conducting material the bearings are prevented from becoming heated when the supply of oil becomes exhausted, and by which construction the friction is greatly diminished.

Having now described my invention, what I claim as new, and desire to secure by Letters Patent, is—

1. A journal-box having its bearings made in halves, the abutting faces of which are slightly convex, so as to form a V-shaped opening between said abutting faces, whereby the said bearings are automatically adjusted to the axle, substantially as specified.

2. The combination, with the cap or shell of an axle-box provided with dovetailed recesses, of the bearings formed in halves having convex abutting faces and provided with dovetail projections engaging the grooves, whereby the bearings are permitted to yield while being held securely in the shell, substantially as specified.

3. In an axle-box, the combination, with the shell thereof, of the bearings having convex abutting faces and the glass blocks set in recesses in the said bearings, substantially as and for the purposes specified.

4. The combination, with the cap or shell, of the bearings having convex abutting faces and dovetail projections, the latter fitting in grooves in the cap, and the glass blocks set in recesses in the bearings, substantially as and for the purposes specified.

In testimony whereof I affix my signature in the presence of two subscribing witnesses.

PETER PFEIFER.

Witnesses:
ALEX. MAHON,
WARREN C. STONE.